US007692058B2

(12) United States Patent
Fuhrmann et al.

(10) Patent No.: US 7,692,058 B2
(45) Date of Patent: Apr. 6, 2010

(54) MERCURY CONTAMINATION EXTRACTION

(75) Inventors: Mark Fuhrmann, Babylon, NY (US); John Heiser, Bayport, NY (US); Paul Kalb, Wading River, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 1400 days.

(21) Appl. No.: 11/021,401

(22) Filed: Dec. 27, 2004

(65) Prior Publication Data

US 2008/0097138 A1 Apr. 24, 2008

(51) Int. Cl.

| | |
|---|---|
| ***A62D 3/00*** | (2007.01) |
| ***A62D 3/30*** | (2007.01) |
| ***B09B 1/00*** | (2006.01) |
| ***B09B 9/00*** | (2006.01) |
| ***B09B 5/00*** | (2006.01) |
| ***C01G 13/00*** | (2006.01) |

(52) U.S. Cl. ......................... 588/412; 423/99; 423/107; 423/561.1; 423/566.1; 588/249; 588/252; 588/255; 588/300; 588/313

(58) Field of Classification Search ................. 423/210, 423/99, 107, 561.1, 566.1; 588/253, 313, 588/249, 252, 255, 256, 300, 314, 412
See application file for complete search history.

(56) References Cited

U.S. PATENT DOCUMENTS

| | | | | |
|---|---|---|---|---|
| 4,354,942 | A | 10/1982 | Kaczur et al. | |
| 4,376,598 | A * | 3/1983 | Brouns et al. | 588/253 |
| 4,844,815 | A * | 7/1989 | Ader et al. | 405/129.25 |
| 5,190,628 | A * | 3/1993 | Bibler | 204/517 |
| 5,300,137 | A * | 4/1994 | Weyand et al. | 75/670 |
| 5,324,433 | A * | 6/1994 | Grant et al. | 210/634 |
| 5,347,072 | A * | 9/1994 | Adams | 588/256 |
| 5,360,632 | A * | 11/1994 | Johnson et al. | 427/212 |
| 5,482,402 | A * | 1/1996 | Nelson | 405/128.65 |
| 5,562,589 | A * | 10/1996 | Adams | 588/256 |
| 5,595,644 | A * | 1/1997 | Doring et al. | 205/766 |
| 5,678,234 | A * | 10/1997 | Colombo et al. | 588/318 |
| 5,840,191 | A * | 11/1998 | Eccles | 210/638 |
| 5,895,832 | A * | 4/1999 | Eccles | 435/262.5 |
| 5,928,617 | A * | 7/1999 | Grande | 423/109 |
| 6,210,078 | B1 * | 4/2001 | Redwine et al. | 405/263 |
| 6,248,217 | B1 * | 6/2001 | Biswas et al. | 204/157.4 |
| 6,258,273 | B1 * | 7/2001 | Gee | 210/620 |
| 6,399,849 | B1 * | 6/2002 | Kalb et al. | 588/15 |
| 6,758,633 | B2 * | 7/2004 | Yen | 405/128.5 |

OTHER PUBLICATIONS

C.N. Mulligan et al., Remediation technologies for metal-contaminated soils and groundwater: an evaluation, 2001, Engineering Geology, 60, 193-207.*
M. Fuhrmann et al., Sulfur Polymer Solidification/Stabilization of elemental mercury waste, 2002, Waste Management, 22, 327-333.*
Paul Randall et al., Advances in encapsulation technologies for the management of mercury-contaminated hazardous wastes, 2004, B114, 211-223.*
Eckles et al., "In-situ Stabilization Utilizing Reactive Fixation Chemistry", National Energy Technology Laboratory publication, www.netl.doe.gov/publications/proceedings/01/indpartner/emp.20.pdf, 1998.
Stine, et al., "Alternative Field Methods to Treat Mercury in Soil", National Energy Technology Laboratory publication, www.netl.doe.gov/publications/proceedings/01/indpartner/emp.18.pdf, 2002.

* cited by examiner

*Primary Examiner*—Timothy C. Vanoy
*Assistant Examiner*—Serena L Hanor
(74) *Attorney, Agent, or Firm*—Lori Anne Neiger; Dorene M. Price

(57) ABSTRACT

Mercury is removed from contaminated waste by firstly applying a sulfur reagent to the waste. Mercury in the waste is then permitted to migrate to the reagent and is stabilized in a mercury sulfide compound. The stable compound may then be removed from the waste which itself remains in situ following mercury removal therefrom.

19 Claims, 3 Drawing Sheets

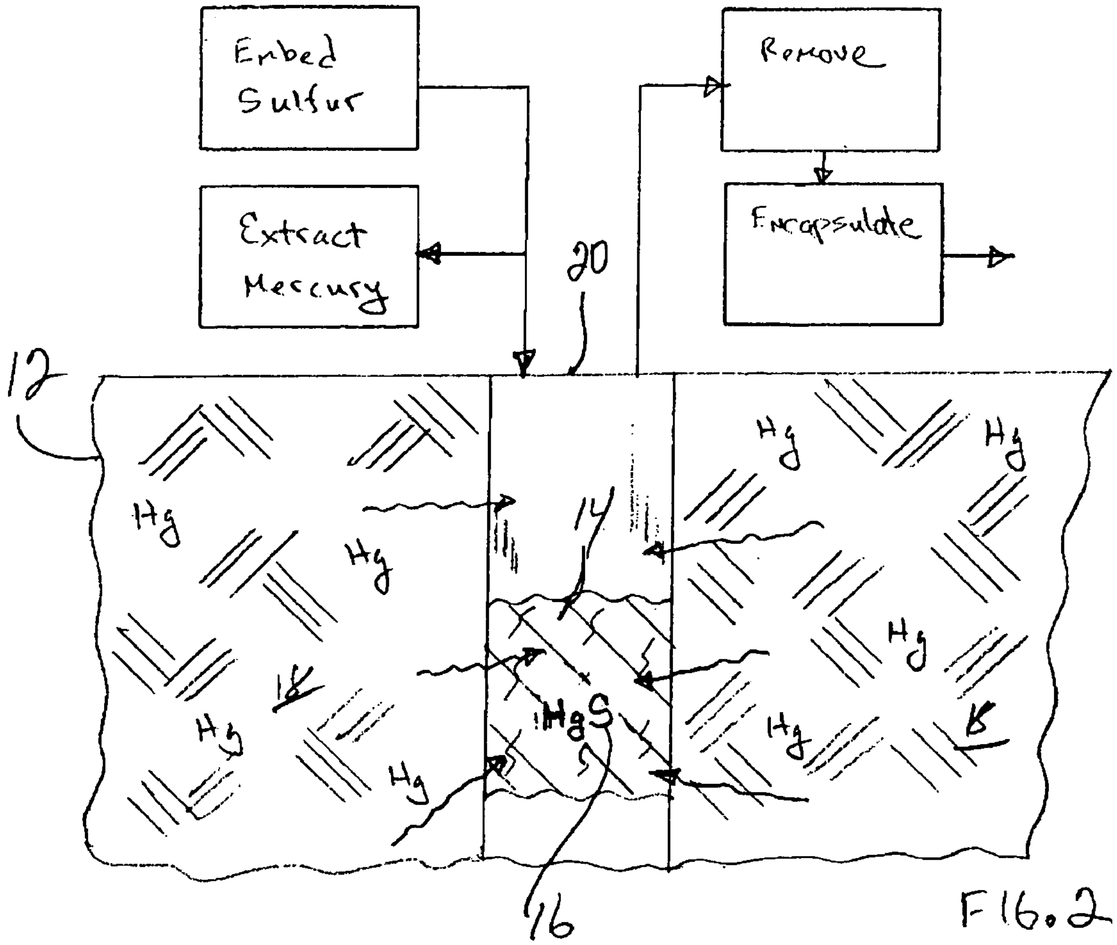
FIG. 2
Fig. 3
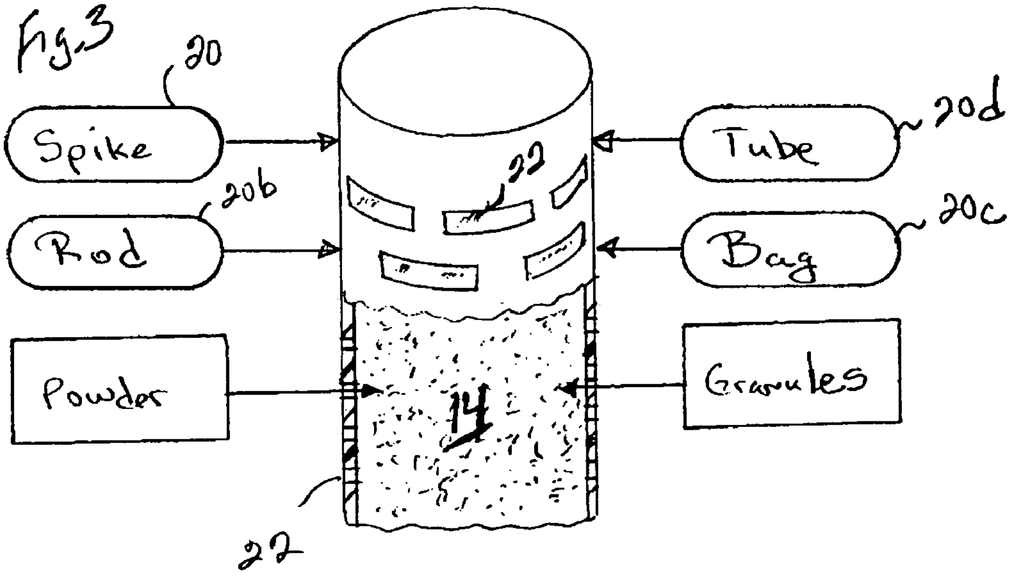

MERCURY CONTAMINATION EXTRACTION

This invention was made with Government support under contract number DE-AC02-98CH10886, awarded by the U.S. Departme certain rights in the invention.

BACKGROUND OF THE INVENTION

The present invention relates generally to hazardous waste, and, more specifically, to mercury removal from contaminated sites.

One form of hazardous waste is mercury. Large amounts of such waste have been generated in both military and civilian applications. Elevated levels of elemental mercury at various geographic locations are considered hazardous to the environment and within the regulatory provisions of the Environmental Protection Agency (EPA) of the U.S. Government.

Regulatory provisions require that mercury contaminated waste containing less than 260 parts-per-million be suitably treated to stabilize the mercury and prevent its leaching into the environment. The regulations include a Toxicity Characteristic Leaching Procedure (TCLP) which determines whether or not the mercury contaminated waste has been sufficiently stabilized for long term disposal without unacceptable leaching.

The stabilization and disposition of the mercury contaminated waste has been the subject of considerable investigation over many years for achieving an economically viable solution thereof. The problem of mercury contamination includes large geographic areas and enormous volumes of waste in the form of soil, sediment, dredge spoils, sludge, and other industrial wastes.

One effective manner for stabilizing mercury waste is the direct reaction of elemental mercury (Hg) with elemental sulfur (S) or sulfur compounds to form mercury sulfide (HgS). Mercury sulfide is a stable and insoluble compound, and substantially reduces its hazardous affects and leaching capabilities.

However, variously known processes for treating mercury contamination have different advantages and disadvantages, with high cost being a substantial disadvantage. In view of the large volume of mercury contaminated waste, the cost for mercury treatment must be sufficiently low to render economically feasible the treatment of the large volumes thereof.

In U.S. Pat. No. 6,399,849 an improved method for treating mercury containing waste is disclosed. Commercially available sulfur polymer cement (SPC) is used to stabilize the mercury in the waste, and is relatively inexpensive. However, the mixture of the stabilized mercury and waste is effected ex situ, and must then undergo a heating and melting process and subsequent cooling to form a monolithic or encapsulated final waste form for meeting the EPA leaching standards. In view of the large volume of mercury contaminated waste and the need for encapsulation thereof, this process has practical and economical limits.

Accordingly, it is desired to provide an improved method for treating mercury contaminated waste for reducing the cost thereof.

BRIEF SUMMARY OF THE INVENTION

Mercury is removed from contaminated waste by firstly applying a sulfur reagent to the waste. Mercury in the waste is then permitted to migrate to the reagent and is stabilized in a mercury sulfide compound. The stable compound may then be removed from the waste which itself remains in situ following mercury removal therefrom.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 2 is an elevational sectional view through an exemplary mercury removal extractor installed in a portion of the site illustrated in FIG. 1 and taken along line 2-2.

FIG. 3 is an elevational, partly sectional view of the mercury extractor illustrated in FIGS. 1 and 2 in accordance with additional embodiments thereof.

DETAILED DESCRIPTION OF THE INVENTION

Figure 1:
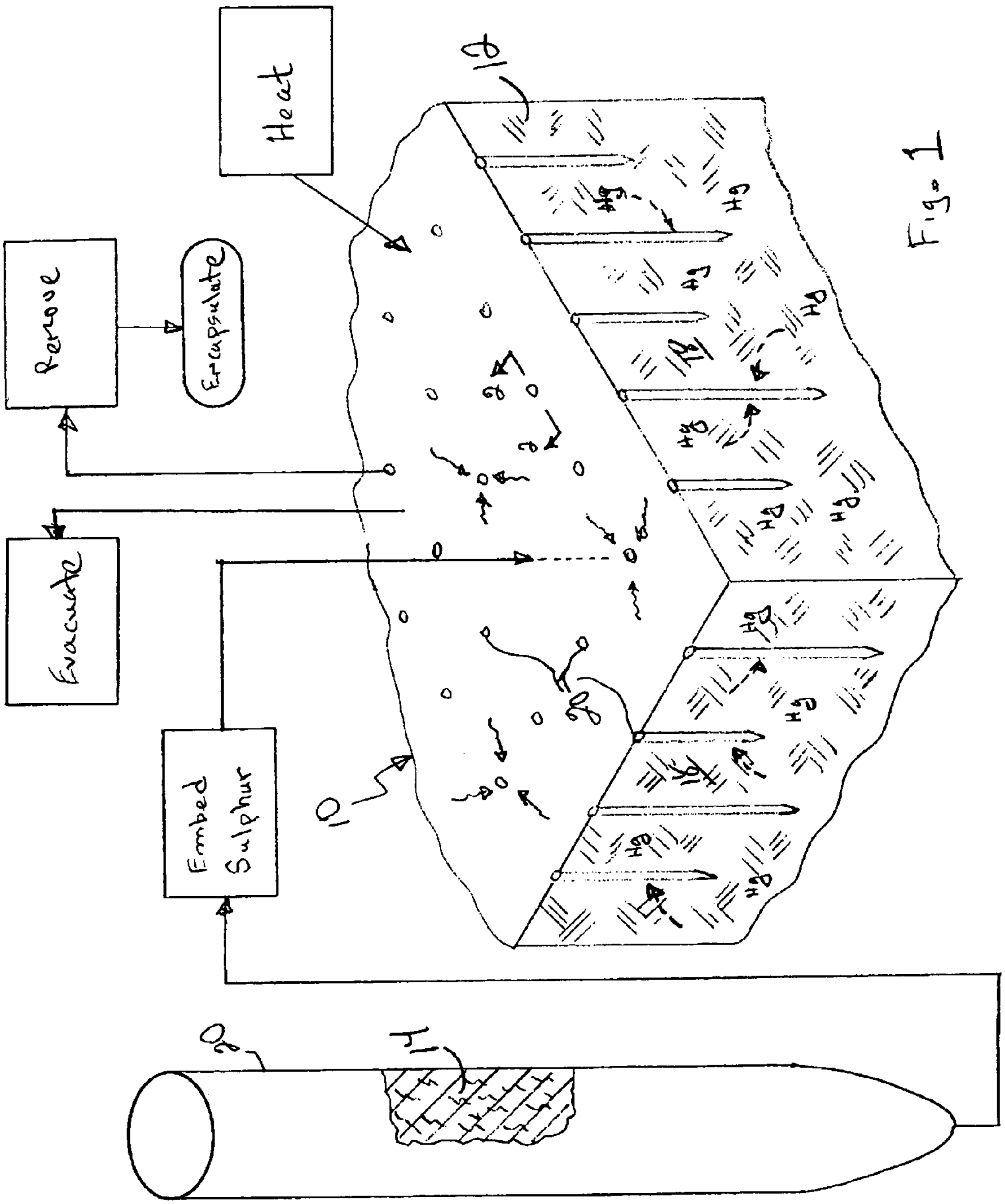
FIG. 1 is a schematic representation of an exemplary method for removing in situ mercury contamination from an exemplary geographic site.

Illustrated in partly sectional view in FIG. 1 is a portion of a geographic contaminated site 10 including waste 12 in the exemplary form of typical earth or soil contaminated by elemental mercury Hg dispersed therein. The term waste is used herein to denote generically the various forms thereof in which hazardous mercury may be dispersed in sufficient amounts for contamination thereof.

The waste in its simplest form is plain earth or soil at its natural in situ geographic location. The waste may also be in the form of sediment, dredge spoils, sludge, and other industrial wastes of various forms contaminated by mercury dispersed therein.

The mercury is found in the waste at various depths below the surface and may be removed therefrom in situ in an improved method or process as disclosed herein. The method commences by applying a sulfur reagent 14 directly in contact with the waste. A sufficient period of time extending over several days to a few weeks is allowed to pass for permitting the mercury found in the waste to migrate or travel through the waste to reach the reagent applied thereto.

Laboratory testing has shown that the mercury can migrate through the waste to reach the reagent, and appears to be driven by the greater vapor pressure of mercury in its gaseous phase. The migrating mercury then chemically reacts with the sulfur reagent for stabilizing the mercury in a mercury sulfide (HgS) compound 16. As indicated above, mercury sulfide is a stable compound with low solubility and remains at the location of the applied reagent as illustrated in FIG. 2.

Accordingly, the stable mercury sulfide compound 16 may then be removed from the waste 12 leaving behind the treated waste itself in situ following removal of the contaminating mercury therefrom.

FIGS. 1 and 2 illustrate that the sulfur reagent 14 is preferably applied locally at one or more portions of the large geographic site of the waste 12 leaving corresponding reagent free zones 18 nearby which directly adjoin the local reagent sites. The mercury in the contaminated waste may then migrate through the waste itself from the corresponding free zones 18 to the local sites of reagent 14.

Since the reagent is effective for migrating the mercury in the immediate vicinity around its local introduction, mercury extraction may be effected at distributed locations over the desired surface area and volume of the contaminated site.

Since it is preferable to remove or extract the mercury from the contaminated site, the sulfur reagent 14 is preferably formed in discrete or removable individual containers or extractors 20, which have the affinity for reacting or extracting the mercury from the contaminated waste. The individual extractors or reactors 20 may be conveniently placed or embedded at spatially distributed sites throughout the contaminated waste and in direct contact therewith for allowing migration of the mercury from the corresponding free zones 18 between the extractors into the individual extractors themselves.

The mercury extractors are distributed spatially across the surface area of the contaminated site and extend in suitable depth into the waste for extracting mercury from the corresponding locations thereof. The individual extractors may then be removed from the waste site, with each having the stable mercury sulfide compounds contained therein.

The removed extractors may then undergo an encapsulating post-process in which the extractors are melted and solidified to form monolithic blocks for reducing the leaching capability thereof, as described in the U.S. patent referenced above. The encapsulated extractors of mercury sulfide may then be disposed of in an approved manner such as at approved landfills.

Laboratory tests have shown that the elemental mercury found in the contaminated waste illustrated in FIG. 1 will migrate over time to the locally introduced sulfur reagent 14. Furthermore, migration of the mercury from the waste to the several mercury extractors can be expedited by correspondingly heating the waste 12 in situ.

For example, suitably heating the waste to an elevated temperature up to about 50 degrees C. can substantial increase the rate of migration of the mercury to the extractors as compared to the rate of migration of the mercury at nominal ambient temperature of the waste of about 20 degrees C. Various method of heating the waste in situ may be used, some of which are described hereinbelow.

An additional mechanism for expediting the migration of the mercury from the waste 12 to the extractors 20 is evacuating the waste 12 by applying a suitable negative pressure differential thereto, i.e. vacuum, which is also described in accordance with a specific embodiment hereinbelow.

In the exemplary embodiment illustrated in FIGS. 1 and 2, a plurality of the mercury extractors 20 are spatially distributed in two dimensional surface area across the exposed top surface of the waste 12 to define a plurality of corresponding reagent-free zones 18 spaced laterally therebetween. The pitch spacing between the individual extractors may be selected in accordance with tests conducted for typical forms of contaminated waste for maximizing the extraction of mercury over the minimum number of days in the extraction period.

The individual extractors may have any suitable configuration and form, and may extend in length to suitable depths below the surface of the contaminated site for reaching the contaminating mercury buried therein.

In the exemplary embodiment illustrated in FIGS. 1 and 2, the individual mercury extractors 20 are in the form of long spikes of solid sulfur having sufficient rigidity for being driven through soft waste for being embedded therein. Each spike may have a sharp distal end for penetrating into the waste.

Alternatively, the extractors may be in the form of long cylindrical rods 20*b* which may be conveniently buried in the waste in holes drilled therefor. FIG. 3 illustrates schematically various alternative forms of the mercury extractors including the solid spike 20 and the alternate solid rod 20*b*. FIG. 3 also illustrates that the individual extractors may be in the form of plastic mesh bags 20*c* in cylindrical form which are filled with the reagent sulfur 14 in powder or larger granule form.

Yet another embodiment of the mercury extractors is a hollow permeable cylindrical tube 20*d* in which the reagent sulfur may be captured inside. The walls of the tube may include suitable pores or apertures 22 sized sufficiently small for containing the reagent inside the tubes while permitting free migration of the external mercury in the contaminated waste into the individual extractors. The pores 22 may also be relatively large and lined with a fine mesh for retaining the reagent inside the tubes in yet another configuration.

As indicated above, the sulfur reagent 14 may be in solid, monolithic form with suitable porosity for permitting migration of the mercury into the reagent for forming therein the stable mercury sulfide compound. Alternatively, the reagent 14 may be in powder form for increasing its effective surface area, with the powder being suitably captured within the extractor to prevent liberation of any reagent dust therefrom.

In yet another embodiment, the reagent sulfur 14 may be in form of granules suitably larger than the fine powder to minimize the generation of any dust therefrom. The granules may be sufficiently large for preventing any loss thereof from the container, while also increasing the effective surface area of the reagent contained in the individual extractors.

Any suitable form of the sulfur reagent 14 may be utilized which has the affinity for reacting chemically with the elemental mercury to form a stable mercury sulfide compound. Elemental sulfur and various compounds thereof, including sodium sulfide for example, may be used to advantage for extracting mercury from the contaminated waste.

In the preferred embodiment, sulfur polymer cement (SPC) is used in the various extractors for its advantages as described in the above referenced patent. The SPC reagent is commercially available from Martin Resources, Inc., Odessa, Tex. under the tradename Chemet 2000.

Figure 4:
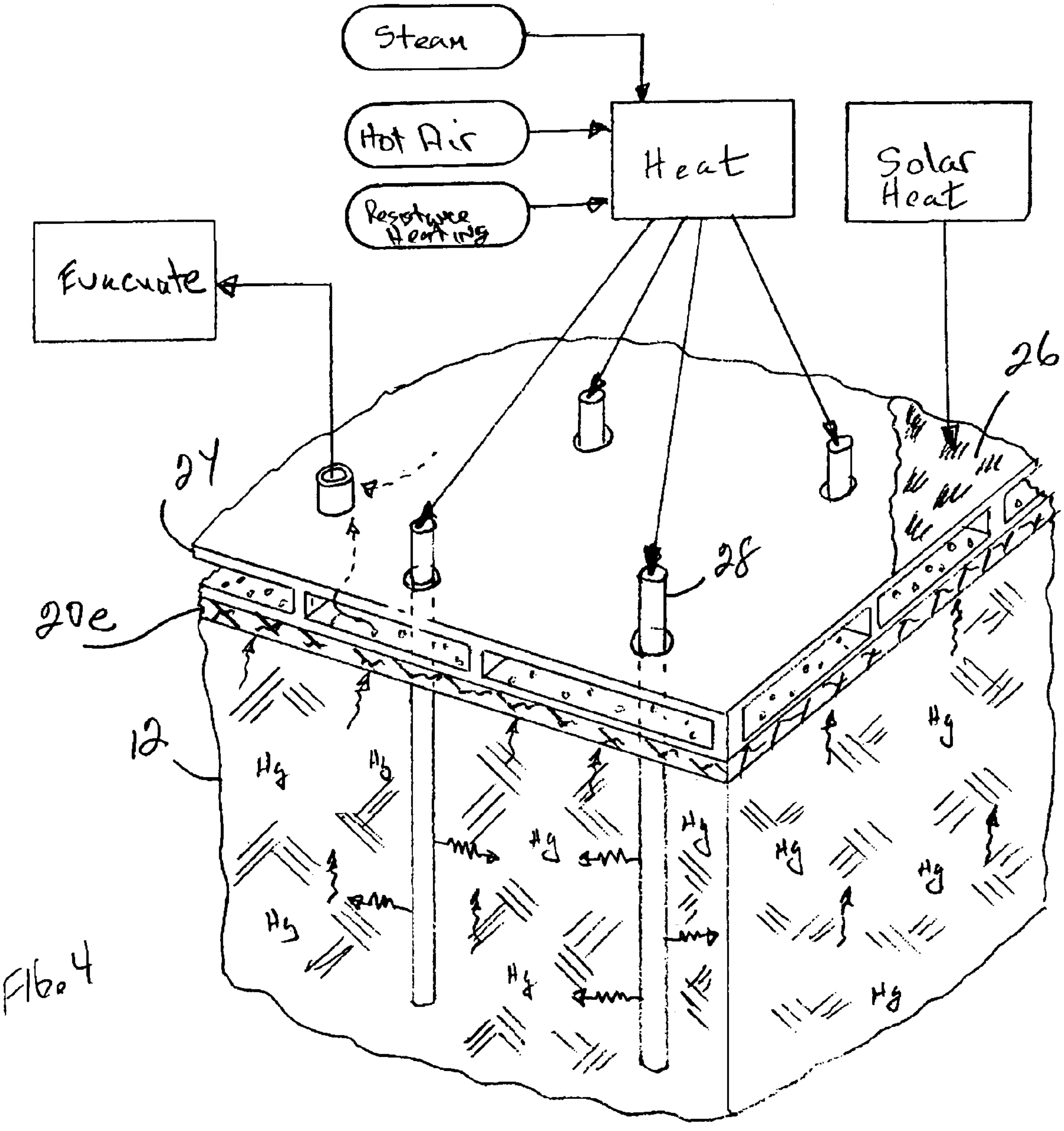
FIG. 4 is a schematic view, like FIG. 1, of a mercury extractor in the form of a blanket covering the contaminated site for removing mercury therefrom in accordance with another embodiment.

Whereas the elongate form of the mercury extractors illustrated in FIG. 1 may be distributed over the surface area of the contaminated site and extend in depth therein, FIG. 4 illustrates yet another embodiment in which the mercury extractor is in the form of a porous blanket 20*e*. The blanket may be rigid or flexible, and woven of a suitable plastic material, for example, and quilted with various compartments therein for containing the reagent sulfur which is distributed in surface area laterally across the full area of the blanket.

The blanket may then be simply stretched over the surface area of the contaminated site to cover the top of the waste and capture the mercury as it migrates upwardly through the waste to reach the blanket.

In this embodiment, the contaminated waste and blanket extractor may be covered by an extraction chamber 24 which has a porous inner wall covering the blanket extractor. A conventional air pump is joined to the chamber for evacuating air from the chamber under partial vacuum to in turn extract air upwardly through the waste 12 for expediting migration of the mercury upwardly to the extraction blanket.

As indicated above, heat may be applied to the waste for further expediting migration of the mercury through the waste. This may be economically effected by covering the chamber, if used, or the extraction blanket atop the waste with a suitable solar blanket 26, in the simple form of black plastic. Solar radiation may then be used for heating the solar blanket which in turn heats the waste for expediting mercury migration through the waste.

In yet another embodiment, a plurality of heating tubes 28 may be embedded in the waste and spatially separated for directly applying heat at depth in the waste. The heat tubes may be simple hollow tubes or serpentine loops joined to a source of heated pressurized air or steam which is driven through the tubes and the waste for heating the waste and promoting mercury migration. Or, the tubes 28 may have resistive heating elements therein electrically powered for generating heat in the waste.

Various forms of the mercury extractors as described above, as well as variations thereof, may be used for effectively extracting or removing mercury from the contaminated waste. Since mercury is transported through waste or soil media and the atmosphere in both gas and liquid phases, both mechanisms may be used for locally extracting mercury into the various forms of the mercury extractors. Since mercury has a relatively high vapor pressure, the gas phase transport mechanism predominates and permits effective migration of the mercury within the waste to the locally embedded mercury extractors.

The various forms of the extractors include sulfur reagent in its various forms to extract or remove the mercury in the waste. Sulfur polymer cement and other compounds of sulfur, like sodium sulfide, readily react with gaseous mercury and act as effective receptors or sinks for extracting the mercury from the waste. The resulting mercuric sulfide is a stable compound with low vapor pressure and low leachability, and is readily removed from the contaminated site by simply removing the discrete extractors therefrom.

The various rod forms of the reagent sulfur illustrated in FIGS. 1-3 can be readily spatially distributed and extend in depth into the waste site. As the mercury is reacted at the rods to form the chemically stable mercury sulfide, a concentration gradient will develop. Natural diffusion processes will draw mercury to the rods which initially have low mercury concentration, which in turn decreases the elevated concentration of mercury remote from the rods.

The spacing of the rods will depend on soil permeability, moisture content, and mercury concentrations among other typical parameters.

Depending on the basic composition of the contaminated site, the sulfur reagent may be simply formed in solid rods and inserted or embedded directly into the waste. Alternatively, a hole may firstly be formed in the waste for then receiving the sulfuric rod therein, or the cylindrical mesh bag form of the rod.

The duration of the extraction period will depend on the specific kinetics, soil type, depth of contamination, and mercury concentration for the individual contaminated site. Local testing of individual sites may be conducted for determining the best form of mercury extractor and distribution thereof within the site.

The sulfur blanket embodiment illustrated in FIG. 4 avoids disturbing the contaminated site itself and merely covers the site to trap the mercury therein. As the mercury vaporizes under natural or under accelerated conditions it migrates upwardly into the sulfur blanket where it reacts to form the stable mercuric sulfide.

Solar radiation may be used to raise the temperature of the waste and increase the kinetic chemical reaction for expediting mercury removal. Thermal energy may also be applied for further expediting mercury extraction. And, differential pressure may be also used for expediting mercury extraction by either applying a vacuum above the blanket, or pumping air under pressure into the soil beneath the blanket.

A charcoal filter may also be employed to cover the sulfuric blanket and further trap any mercury vapor that does not react with the sulfuric blanket, thus preventing its release into the surrounding atmosphere.

The various forms of mercury extractors disclosed above may be economically fabricated and economically used in situ for extracting mercury from contaminated waste. The contamination site itself remains basically unaltered, with only the extractors being installed and removed locally therefrom. The extractors could also be used ex situ, if desired, which would then require removal of waste from the contaminated sites, at additional cost.

Alternatively, the treated and stabilized mercury could remain in place in situ in its chemically stable form, if practical. Since the sulfur is locally contained in the various forms of extractors, minimal disruption of the waste site is required for their implementation, and at a significantly lower cost.

In the basic process for mercury stabilization, the extractors are applied locally to the contaminated waste. Mercury in the waste migrates locally through the waste to the extractors. Inside the extractors, the mercury reacts with the sulfur to form the stabilized mercury sulfide compound.

The extractors may then be removed from the waste site, and suitably disposed of; or the extractors could be left inside the waste site for in situ stabilization of the mercury for an indefinite period of time as practical.

The individual container form of the extractors, such as the solid spike, mesh bag, and permeable tube, permit relatively easy and inexpensive insertion thereof into the waste site, with minimal disruption of the waste site material. Correspondingly, these extractors may also be readily removed from the site individually at low cost.

Mass disruption of the waste material, or mass removal, mixing, or replacement thereof is not required or desirable for reducing processing costs for mercury stabilization. The various forms of mercury extractors disclosed above therefore can enjoy effective performance in stabilizing mercury in situ, and at relatively low cost.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A method for removing mercury from waste contaminated therewith comprising:

locally applying a sulfur reagent to the waste;

migrating mercury through the waste to the sulfur reagent;

chemically stabilizing the migrated mercury with the sulfur reagent in a mercury sulfide compound; and removing the stable compound in-situ from the waste.

2. A method according to claim 1 wherein:

the sulfur reagent is applied locally to only a portion of the waste leaving a sulfur reagent free zone nearby; and the mercury migrates through the waste from the free zone to the sulfur reagent.

3. A method according to claim 2 further comprising:

forming the sulfur reagent in a discrete extractor;

placing the extractor in contact with the waste for migrating the mercury from the free zone into the extractor; and removing the extractor from the waste with the stable compound therein.

4. A method according to claim 3 further comprising encapsulating said removed extractor to reduce leaching capability thereof.

5. A method according to claim 3 further comprising heating said waste to expedite migration of said mercury from said waste to said extractor.

6. A method according to claim 5 further comprising covering the waste with a solar blanket (26), and heating the waste with solar energy to expedite migration of the mercury from the waste to the extractor.

7. A method according to claim 5 further comprising injecting heat into the waste to expedite migration of the mercury from the waste to the extractor.

8. A method according to claim 7 wherein the heat is injected by electrical resistive heating inside the waste to expedite migration of the mercury from the waste to the extractor.

9. A method according to claim 7 wherein the heat is injected by heated air channeled inside the waste to expedite migration of the mercury from the waste to the extractor.

10. A method according to claim 3 further comprising evacuating said waste to expedite migration of said mercury from said waste to said extractor.

11. A method according to claim 10 further comprising covering the waste with an extraction chamber, and evacuating the chamber to extract air from the waste to expedite migration of the mercury from the waste to the extractor.

12. A method according to claim 3 wherein:

said extractor comprises a blanket containing said reagent distributed in surface area across said blanket; and said blanket is extended in surface area to cover the top of said waste.

13. A method according to claim 3 further comprising a plurality of said extractors spatially distributed in an array across said waste to define a plurality of said free zones spaced laterally therebetween.

14. A method according to claim 13 wherein said extractors comprise reagent sulfur in solid spikes.

15. A method according to claim 13 wherein said extractors comprise reagent sulfur in mesh bags (20*c*).

16. A method according to claim 13 wherein said extractors comprise reagent sulfur captured in hollow permeable tubes.

17. A method according to claim 16 wherein said reagent sulfur comprises powder retained in said tubes.

18. A method according to claim 16 wherein said reagent sulfur comprises granules retained in said tubes.

19. A method according to claim 3 wherein said reagent sulfur comprises sulfur polymer cement.

* * * * *